Dec. 31, 1940.  J. H. DE BOER  2,227,070
PROJECTION SYSTEM
Filed June 8, 1938
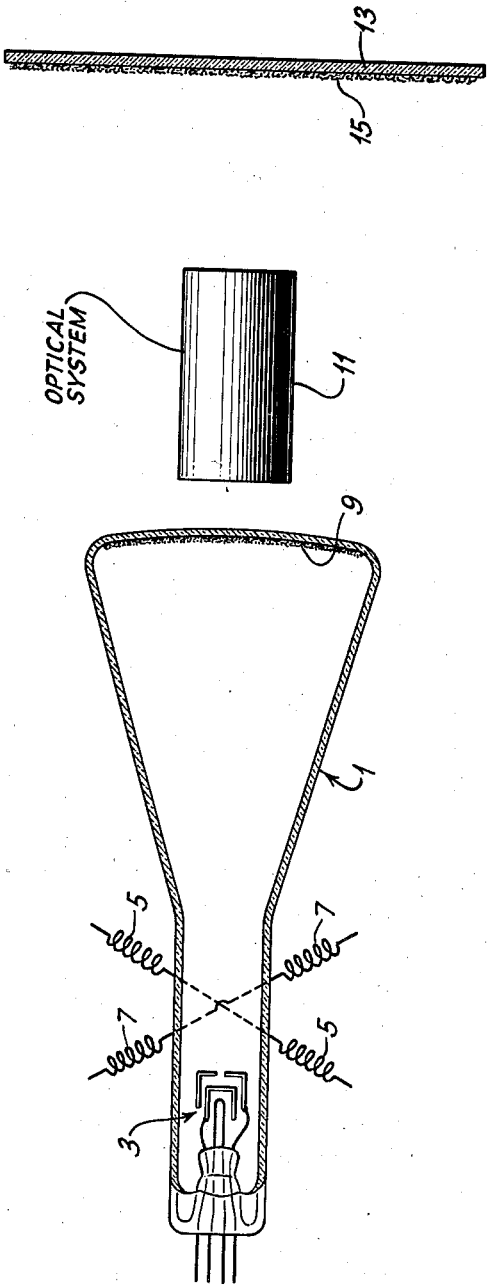
INVENTOR.
JAN HENDRIK DE BOER
BY
ATTORNEY Patented Dec. 31, 1940

2,227,070

UNITED STATES PATENT OFFICE 2,227,070

PROJECTION SYSTEM

Jan Hendrik de Boer, Eindhoven, Netherlands, assignor, by mesne assignments, to Radio Corporation of America, New York, N. Y., a corporation of Delaware Application June 8, 1938, Serial No. 212,528
In Germany June 9, 1937

6 Claims. (Cl. 178—7.5)

This invention relates to image projection systems, and more particularly to image projection systems wherein a cathode ray tube is used to produce an image which is subsequently projected upon a viewing screen such as is provided for large scale television reproducing systems.

Use has been made of the image produced on the luminescent screen of a cathode ray tube by projecting the produced image by means of an optical system upon a viewing screen. While in recent times tubes have been built in which the luminescent screen under impact of the cathode ray has such high brilliancy that the projected image on the viewing surface can be clearly seen, the results obtained have not been in general, completely satisfactory.

The drawbacks encountered in such a system cannot be overcome entirely, by still further increasing the brilliancy of the image produced on the cathode ray screen, since part of the difficulties arises from the fact that the light produced by the fluorescent screen of the cathode ray tube is not white, but rather, the radiations have a definite color which is determined by the particular material used in making the fluorescent screen. That is to say that the fluorescent material has a spectral emission characteristic which is dependent upon the physical and chemical properties of the luminescent material. The color of the light radiated by the luminescent screen of the cathode ray tube, therefore, may be blue, green, yellow, or red, in accordance with the use of calcium-tungstate, synthetic alpha willemite, synthetic beta willemite, or cadmium sulphide, respectively. The result is that the image projected upon the viewing plane will have the same color as that of the cathode ray screen, and since in general, a colored image provides a smaller contrast range than a black and white image, the reproduced pictures are not as satisfactory as those which would be obtained if a black and white image were produced.

It has been suggested that black and white images might be provided by placing an absorption filter between the cathode ray tube and optical system, the absorbing filter having a spectral transmission characteristic the inverse of the spectral emission of the luminescent material. This, however, is unsatisfactory for two reasons. In the first place, the transmission loss through the filter is so great that the resulting image lacks brilliancy and in the second place, the spectral emission of the luminescent material being generally confined to a very narrow band of frequencies, cannot when combined with the absorbing filter give white light, since vital components in the spectrum are missing to begin with.

Likewise the suggestion of combining a number of different fluorescent materials each having different spectral emission characteristics so chosen as to give an over-all response to white is unsatisfactory, since in general, each of the materials has a different time of extinction, different longevity, and generally shorter life than those screens prepared from a single material.

In accordance with this invention, the above enumerated difficulties are overcome, at the same time producing substantially black and white images by projecting the light from the luminescent screen through a suitable optical system upon a viewing screen coated with a fluorescent material having a spectral emission complementary to that of the luminescent screen of the cathode ray tube so that the light from the luminescent screen of the cathode ray tube excites the fluorescent material of the viewing surface and the combined reflected light from the viewing surface and radiated light from the surface provide a white light spectral response.

Accordingly, it is the main object of this invention to provide an improved cathode ray tube image projecting system.

A further object of the invention is to provide method and means for producing black and white projected images from a cathode ray tube, while at the same time providing improved efficiency of projection together with a long life cathode ray screen.

Other objects of the invention will become clear upon reading the following description together with the drawing, in which I have shown schematically a cathode ray tube optical system and viewing screen arranged according to the invention.

In the drawing, I have shown a cathode ray tube 1 wherein is mounted an electron gun 3 for producing the focused beam of electrons to impact upon a luminescent screen 9 mounted on the end wall of the tube. A suitable deflected system is provided by the electromagnetic coils 5 and 7, although it is understood that electrostatic deflecting systems or combined electrostatic and electromagnetic deflecting systems could be used with equal facility.

Positioned in register with the luminescent screen 9 is the optical system 11 for projecting an enlarged image on the screen 13. The surface of the screen receiving the light from the luminescent screen 9 is coated with a fluorescent material 15 which fluorescent material when irradiated with light from the screen 9 emits light having a spectral distribution characteristic complementary to the light from the screen 9. Under these conditions, an observer looking at the screen 13 will receive all the components of energy present in white light so that the resultant image will appear to be black and white.

In carrying out the invention, if the fluorescent screen 9 is made from alpha zinc silicate which fluoresces with a greenish color then the screen 13 may be coated with rhodamine, which fluoresces orange or red when excited by the green light produced from the screen 9. If the screen 9 is made from a mixture of calcium tungstate and magnesium silicate which gives a color containing both blue and red under the impact of cathode ray tubes, then the screen 13 may be coated with fluorescein, since fluorescein when excited by the blue light of the calcium tungstate fluoresces green so that the combined reflected and radiated light from the screen 13 will contain blue, green and red, and hence, give black and white images.

It is, of course, possible to prepare the viewing surface 13 as a transparent screen, such as ground glass so that the observer may be positioned on the other side of the screen from that which receives light from the cathode ray tube, and it is, of course, understood that while the invention will have possibly its greatest utility in the television field, it may be used in general with cathode ray oscillographs for demonstration or measurement purposes.

Having now described my invention, what I claim is:

1. The method of producing black and white images upon a viewing plane which comprises the steps of producing a light image having a predetermined spectral emission characteristic, projecting the produced image toward the viewing plane, inducing fluorescence at the viewing plane by the produced image, said fluorescence having spectral emission characteristic complementary to the emission characteristic of the produced image, and having an intensity proportional to the intensity of the produced image.

2. An image projection system comprising a cathode ray tube having a fluorescent screen having a predetermined spectral emission characteristic, an optical system in register with the fluorescent screen, and a viewing plane coated with a fluorescent substance having a spectral emission characteristic complementary to the emission characteristic of said screen on one surface positioned in register with both the optical system and the fluorescent screen.

3. An image projection system comprising a cathode ray tube having a luminescent screen, means within the cathode ray tube for producing a light image of predetermined spectral emission from the luminescent screen, a viewing surface coated with a fluorescent material having spectral emission complementary to the predetermined spectral emission of the luminescent screen within the cathode ray tube, and an optical system positioned intermediate the cathode ray tube and the fluorescent screen.

4. An image projection system comprising a fluorescent screen made from alpha zinc silicate, cathode ray means for producing an image on the screen, a viewing surface coated with rhodamine positioned in register with the fluorescent screen, and an optical system positioned intermediate the screen and viewing surface.

5. An image projection system comprising a fluorescent screen made from calcium tungstate and magnesium silicate, cathode ray means for producing an image on the screen, a viewing surface coated with fluorescein positioned in register with the fluorescent screen, and an optical system positioned intermediate the screen and viewing surface.

6. An image projecting system comprising a cathode ray tube having a luminescent screen, means within the cathode ray tube for producing a light image of predetermined spectral emission from the luminescent screen, a diffusely reflecting viewing surface coated with a fluorescent material having spectral emission complementary to the predetermined spectral emission of a luminescent screen within the cathode ray tube, and an optical system positioned intermediate the cathode ray tube and the fluorescent screen.

JAN HENDRIK DE BOER.